2,980,750
BATTERY SEPARATORS

Charles L. Mills, Jr., Longmeadow, Mass., assignor to Monsanto Chemical Company, St. Louis, Mo., a corporation of Delaware No Drawing. Filed Feb. 26, 1959, Ser. No. 795,594

2 Claims. (Cl. 136—145)

This invention relates to battery separators. More particularly, the invention relates to battery separators having improved re-wettability by battery acid.

"Dry charge" lead-acid type batteries present a particular problem in the selection of separators for use therein, because the wetting agents conventionally incorporated with the separators to expedite charging of the metallic plates are usually removed when the battery acid is drained from the unit prior to storage in the "dry" condition. As a result, the separators are not instantly re-wettable by battery acid and, when the unit is refilled with battery acid prior to actual use of the battery, it may require about 20–30 minutes for the battery to develop maximum power.

One object of this invention is to provide battery separators having improved re-wettability by battery acid. Another object is to provide processes for preparing such battery separators.

These and other objects are attained by incorporating certain water-soluble polyelectrolytes with liquid-permeable battery separators of the phenolic resin-impregnated paper base type. The polyelectrolytes are hydrolyzed or ammoniated copolymers of maleic anhydride and an olefin containing 2–4 carbon atoms.

The following examples are given to illustrate the invention and are not intended as a limitation thereof.

Example I

A thin, air-permeable paper base having an alpha-cellulose content of about 93% is impregnated with an aqueous solution of an A-stage phenol-formaldehyde resin to form a liquid-permeable sheet containing 35% by weight of phenol-formaldehyde resin, based on the combined weights of resin and paper fiber. The impregnated sheet is dried, cured to advance the resin to the C-stage, and formed into the proper size and shape for a battery separator.

When the battery separator prepared in this example is used in a "dry charge" lead-acid type battery, several hours are required to accomplish charging of the metallic plates when the battery acid is first added to the unit, and, when the unit is refilled with battery acid after having been stored in "dry" condition, the battery does not develop maximum power until about 20 minutes after the addition of the acid.

Example II

Example I is repeated with the exception that 5% by weight of a dioctyl ester of sodium sulfosuccinic acid, based on the weight of phenol-formaldehyde resin, is incorporated into the impregnating solution.

When the battery separator prepared in this example is used in a "dry charge" lead-acid type battery, it is found that the incorporation of the dioctyl ester of sodium sulfosuccinic acid imparts virtually instant wettability to the separator, resulting in a substantial decrease in the time required to charge the metallic plates when battery acid is first added to the unit. However, the ineffectiveness of this wetting agent in improving the wettability of the separator through more than one immersion in battery acid is indicated by the fact that when the unit is refilled with battery acid after having been stored in "dry" condition, the battery does not develop maximum power until about 20 minutes after the addition of the acid.

Example III

Example I is repeated with the exception that there is incorporated into the impregnating solution 4% by weight, based on the weight of phenol-formaldehyde resin, of a hydrolyzed ethylene-maleic anhydride copolymer having a specific viscosity of 0.1, determined by measurement of a solution of 1% by weight of the copolymer in dimethylformamide at 23° C.

When the battery separator prepared in this example is used in a "dry charge" lead-acid type battery, it is found that the incorporation of the hydrolyzed ethylene-maleic anhydride copolymer imparts virtually instant wettability to the separator through two immersions in battery acid. As a result, there is a substantial decrease in the time required to charge the metallic plates when battery acid is first added to the unit and a virtually instantaneous development of maximum power in the battery when the unit is refilled with battery acid after having been stored in "dry" condition.

Example IV

Example I is repeated with the exception that, after the impregnated sheet has been dried but before it has been cured, it is immersed in an aqueous solution of a hydrolyzed ethylene-maleic anhydride copolymer having a specific viscosity of 0.1 (determined by measurement of a solution of 1% by weight of the copolymer in dimethylformamide at 23° C.) to coat the sheet with 1% by weight of the copolymer, based on the weight of phenol-formaldehyde resin in the sheet.

When the battery separator prepared in this example is used in a "dry charge" lead-acid type battery, it shows substantially the same characteristics of wettability and re-wettability as the battery separator prepared in Example III.

The battery separators of the invention comprise phenolic resin-impregnated paper base sheets containing water-soluble polyelectrolytes. Battery separators of the phenolic resin-impregnated paper base type are well known to the art and may be described generally as liquid permeable sheets obtained by impregnating a thin, air-permeable paper base with an aqueous solution of an A-stage phenol-formaldehyde resin, drying, and curing the sheet to advance the resin to the C-stage. The terms "A-stage" and "C-stage" refer respectively to the low molecular weight product obtained by condensing phenol with a molar excess of formaldehyde under alkaline conditions so as to form a soluble, fusible material and to the high molecular weight product obtained by curing the soluble, fusible material, usually at temperatures of about 150–290° C., to form an insoluble, infusible material. The separators usually contain 25–60% by weight of phenol-formaldehyde resin, based on the combined weights of resin and paper fiber. The present invention is concerned with the modification of these already-known battery separators to improve their re-wettability by battery acid.

The water-soluble polyelectrolytes utilizable in preparing the battery separators of the invention are hydrolyzed or ammoniated copolymers of maleic anhydride and an olefin containing 2–4 carbon atoms, e.g., ethylene, propylene, or isobutylene. These polyelectrolytes and methods for preparing them are already known to the art. Usually they are obtained by reacting a 1:1 olefin-maleic anhydride copolymer with water or steam to convert the maleic anhydride units to maleic acid units or by reacting a 1:1 olefin-maleic anhydride copolymer with ammonium hydroxide or anhydrous ammonia to convert the maleic anhydride units to units of diammonium maleate, maleimide, or the half-ammonium salt half-amide of maleic acid. The polyelectrolytes used in the practice of this invention have specific viscosities in the range of 0.1–1.4, preferably 0.1–0.4, as determined by measurement of a solution of 1% by weight of the copolymer in dimethyl-formamide at 23° C. In modifying phenolic resin-impregnated paper base sheets to form the battery separators of the invention, 0.5–10%, preferably 0.5–2.5%, by weight of polyelectrolyte is employed, based on the weight of phenol-formaldehyde resin in the sheet.

The polyelectrolyte may be incorporated with the battery separator by adding an aqueous solution of the polyelectrolyte to an aqueous solution of A-stage phenol-formaldehyde resin and impregnating an air-permeable paper base with the resin and polyelectrolyte simultaneously. This method of incorporation effects substantially uniform distribution of the polyelectrolyte throughout the sheet.

Alternatively, an aqueous solution of the polyelectrolyte may be applied to a paper base sheet which has already been impregnated with an A-stage phenol-formaldehyde resin and dried. This application of the polyelectrolyte solution may be accomplished by immersion, spraying, or other suitable coating technique before the dried sheet is cured, while the sheet is being cured, or at some stage after curing while the sheet is still hot from the curing step. This method of application effects a coating or surface impregnation of the sheet with the polyelectrolyte rather than the uniform distribution resulting from simultaneous impregnation of the paper base with the A-stage phenol-formaldehyde resin and polyelectrolyte.

The battery separators of the invention have improved re-wettability by battery acid as compared to phenolic resin-impregnated paper base type battery separators not containing hydrolyzed or ammoniated olefin-maleic anhydride copolymers. Therefore, they are particularly useful in "dry charge" lead-acid type batteries since they permit virtually instantaneous development of maximum power in the battery when the unit is refilled with battery acid after having been stored in "dry" condition.

It is obvious that many variations may be made in the products and processes set forth above without departing from the spirit and scope of this invention.

What is claimed is:

1. A liquid-permeable battery separator comprising an air-permeable paper base sheet impregnated with a C-stage phenol-formaldehyde resin, said separator having incorporated therewith 0.5–10% by weight, based on the weight of phenol-formaldehyde resin, of a water-soluble polyelectrolyte of the group consisting of the hydrolyzed and ammoniated copolymers of maleic anhydride and an olefin containing 2–4 carbon atoms.

2. A liquid-permeable battery separator as in claim 1 wherein the polyelectrolyte is a hydrolyzed ethylene-maleic anhydride copolymer having a specific viscosity of 0.1.

References Cited in the file of this patent

UNITED STATES PATENTS

| | | |
|---|---|---|
| 2,028,091 | Jaeger | Jan. 14, 1936 |
| 2,291,080 | Hofferbert | July 28, 1942 |
| 2,441,896 | Moir | May 18, 1948 |
| 2,700,694 | Fernald | Jan. 25, 1955 |
| 2,794,753 | Duddy | June 4, 1957 |
| 2,799,719 | Schaefer et al. | July 16, 1957 |
| 2,872,497 | Beckvold et al. | Feb. 3, 1959 |

FOREIGN PATENTS

| | | |
|---|---|---|
| 534,618 | Great Britain | Mar. 12, 1941 |